Oct. 31, 1944.  E. L. BECKWITH ET AL  2,361,735
SCABBARD
Filed Nov. 24, 1942
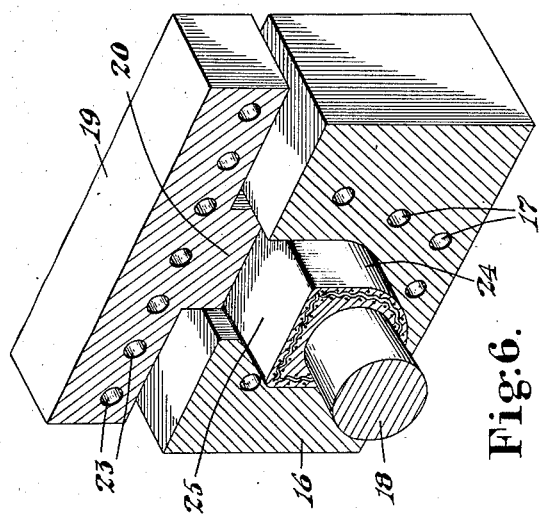
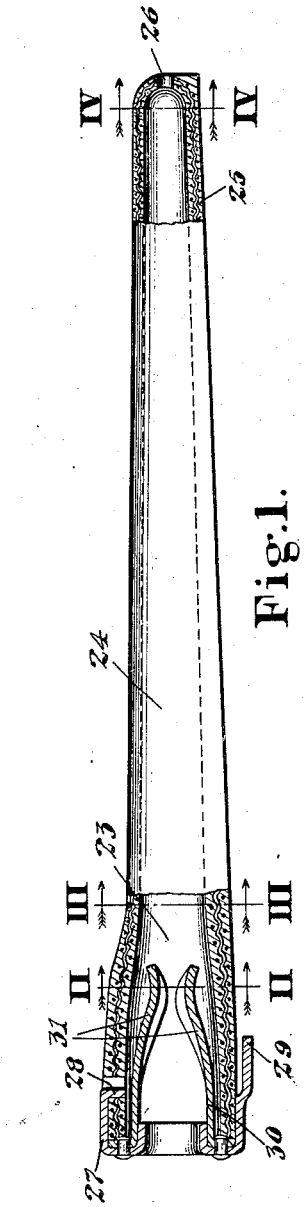
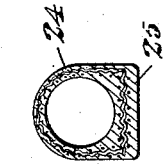
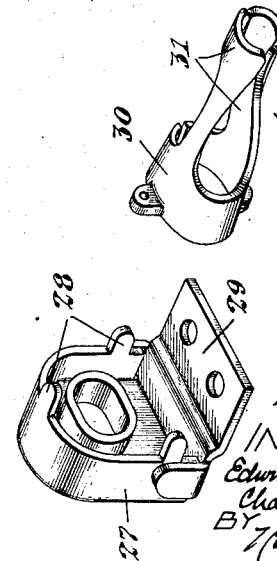
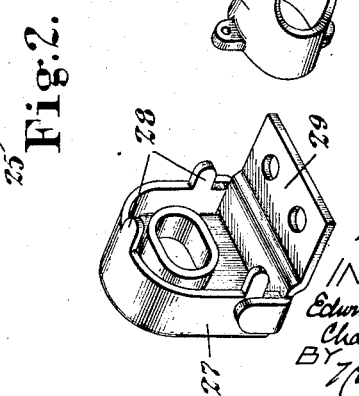
INVENTORS
Edwin L. Beckwith &
Charles P. MacIver
BY Kenway & Witter
Attys.

Patented Oct. 31, 1944

2,361,735

UNITED STATES PATENT OFFICE 2,361,735

SCABBARD

Edwin L. Beckwith, Brookline, and Charles P. MacIver, Stow, Mass., assignors to Beckwith Manufacturing Company, Dover, N. H., a corporation of New Hampshire Application November 24, 1942, Serial No. 466,774

1 Claim. (Cl. 224—2)

This invention relates to scabbards or sheaths for bayonets, trench knives and the like. It consists in a novel and improved scabbard or sheath having certain advantages over those heretofore available, more especially in respect to lightweight, adequate strength, permanent shape, waterproof characteristics, and hardness. The invention includes within its scope the novel process herein disclosed of manufacturing the improved scabbard or sheath. In one important aspect, my invention consists in a molded scabbard having an enclosure of circular contour in a cross-section supplying and being of such construction as to supply a distribution and thickness of molded material imparting strength and stiffness to the scabbard as a whole.

Scabbards have heretofore been molded having extraneous strengthening ribs as disclosed for example in our copending application, Ser. No. 312,192, filed January 3, 1940, now Letters Patent No. 2,316,766, dated April 20, 1943. An object of the present invention is to provide a bayonet scabbard of molded plastic material having no reentrant angles in its external contour, and at the same time having sufficient plastic material and reinforcing fabric distributed in a compact cross-sectional arrangement to provide relatively stiff and heavy longitudinal elements imparting strength and rigidity to the scabbard as a whole.

For purposes of illustration we have selected the scabbard for the Enfield rifle bayonet as illustrating one important field of use for our invention. In carrying out our invention we employ a thermoplastic material such as acrylic resins, vinyl resins, ethyl cellulose or cellulose acetate butyrate, molded with a fabric reinforcement such as canvas which is compressed in the molding operation and held under compression within the shell of hard thermoplastic material. The fabric is pretreated in sheet form by giving it a light coating or impregnation of a solvent solution of the thermoplastic compound to be used. This binds and impregnates the fibres and obviates raveling so that the blanks can be cut to the desired shape from sheet fabric without fraying.

We die out similar but slightly larger blanks from vinyl resin or other thermoplastic sheets of an order .010 to .030" in thickness. The plastic sheets correspond in shape but are slightly larger than the contour of the fabric blanks. The fabric blanks are of a size to leave a slight marginal clearance in the mold whereas plastic blanks completely fill the mold. One or more fabric blanks are interleaved between two of the plastic blanks and fastened to provide a composite blank.

The problem we have solved is that of molding blanks of the character described into a scabbard which includes relatively stiff and heavy longitudinal elements completely concealed within the periphery of the scabbard. So far as we know strength and stiffness have not heretofore been secured from internal ribs, or longitudinal elements molded into the body of the scabbard and lying wholly within its periphery.

The scabbard herein shown has an elongated enclosure of substantially circular cross-section and tapering longitudinally. Externally it has a U-shaped wall and a flat wall which extends between the edges of the U-shaped wall forming substantially right angles with its sides and imparting to the complete scabbard a cross section which is approximately D-shaped or half semicircular and half rectangular. The internal reinforcing ribs or longitudinal elements are molded in the longitudinal corners of the scabbard and bounded externally by the plane surfaces which intersect along these lines.

In producing the scabbard of our invention we first curve or shape a relatively wide composite blank into the U-shaped form about a horizontally disposed mandrel of the proper shape. The two sides of the blank are brought into upstanding parallel relation and terminate substantially flush with the top of the mandrel. We then prepare a narrower composite blank of the same character and assemble this in horizontal position above the mandrel in contact with the upstanding edge of the U-shaped mandrel. Having assembled the blanks in this manner they are heated and subjected to a molding operation which fuses them into an integral body and at the same time molds the plastic material into solid internal ribs or elements within the corner edges of the scabbard.

These and other features of the invention will be best understood and appreciated from the following description of a preferred embodiment thereof selected for purposes of illustration and shown in the accompanying drawing in which, Fig. 1 is a view of the scabbard in side elevation, partly in longitudinal section, Figs. 2, 3 and 4 are views in cross section on the planes II—II, III—III, and IV—IV of Fig. 1, Fig. 5 is a fragmentary view showing a portion of the composite blanks from which the scabbard is formed, Fig. 6 is a fragmentary view in perspective showing portions of the mandrel with the upper and lower dies and a portion of the completed scabbard, the portions being broken away to show short lengths of each, and Fig. 7 is an exploded view in perspective of the component parts of the fitting.

In the illustrative example of the process, elongated fabric blanks 11 and 14 of the proper width are died from a heavy 22 or 24 oz. canvas or mill duck which has previously been coated in sheet form with a solution of vinyl resin in any appropriate solvent. Blanks 10, 12, 13 and 15 of vinyl resin in sheet form are now cut out in a thickness of about .024". The sheet thermoplastic blanks are of the same shape as the fabric blanks, but of slightly larger dimensions so that they may overlap each other about the margins of the fabric blank symmetrically on all edges. The two plastic blanks 10 and 12 are now assembled with a single fabric blank 11 as suggested in Fig. 5 and the three blanks secured in assembled relation by subjecting them to heat and pressure in one or more spots thus forming a composite blank of canvas interleaved between sheets of Vinylite. Similarly the canvas blank 14 is assembled and secured to the Vinylite blanks 13 and 15. The two composite blanks are similar except that the latter is substantially wider.

The units above described may be molded in producing scabbards as suggested in Fig. 6, which shows a fragment of the milded scabbard in position at the conclusion of the molding operation. The lower die 16 contains a recess or trough having a semi-circular bottom and vertical parallel side walls. It is provided also with passages 17 through which steam may be supplied for heating the die and water for cooling it.

A steel mandrel 18 is employed in cooperation with the lower die 16, both the die and the mandrel tapering in cross-section toward one end. The wide composite blank 13, 14, 15 is placed in the lower die 16 beneath the mandrel 18 and caused to assume a U-shape by being wrapped about the lower semi-circular face of the mandrel and extending upwardly at its side edges in contact with the vertical walls of the die cavity. The narrower composite blank 10, 11, 12 is then placed in the die cavity across the upstanding ends of the U-shaped blank. The upper die 19 has a substantially rectangular portion 20 arranged to fit into the cavity of the lower die 16. Having assembled the blanks as above explained both dies are heated and then brought together with heavy pressure. Under pressure and heat the two blanks are fused together within the mold cavity along their areas of contact. The thermoplastic material is softened and solidly fills all the space between the mandrel 18 and the dies 16 and 19. The thermoplastic material with its enclosed fabric is molded into semi-circular cross section below the mandrel, the space at each corner of the scabbard bounded externally by the horizontal and vertical walls thus formed, and bounded internally by the circumference of the mandrel 18, is filled with solid thermoplastic material, thus forming spaced parallel, relatively heavy internal ribs or longitudinal stiffening members. There is no longitudinal displacement of the composite blanks. The canvas sheets are however heavily compressed within their plastic shell. When the molding pressure has been maintained sufficiently to effect these results and produce an integral scabbard, steam is cut off in the passages 17 and 23 and a cooling medium supplied. The scabbard and mandrel are then removed from the mold and the mandrel pulled out of the molded scabbard which is now ready to be finished by being provided with its necessary fittings. The molded scabbard is stiff and resilient and derives great strength from the strong and tough canvas insert which is held compressed within a complete envelope or shell of hard plastic material and also from the solid longitudinal elements included in its structure.

The completed scabbard is shown in Fig. 1. The outer U-shaped wall of the finished scabbard is indicated by reference character 24 and its flat wall upon which it is shown as resting in Fig. 1 is indicated by reference character 25. A small hole 26 is drilled in the end of the scabbard to allow for the escape of water in the field and similar holes are formed in the body of the scabbard a short distance from its open end to facilitate attachment of the metal fitting. Figs. 2, 3 and 4 show the cross-sectional shape of the scabbard at the indicated locations along its length.

The metal fitting comprises a D-shaped ferrule 27 of the proper dimensions to fit upon the reduced open end of the scabbard. It is provided with three tongues 28 which are bent inwardly into the opening formed for that purpose in the body of the scabbard. At its straight side it is provided with a rectangular plate 29 which is shown in Fig. 1 as spaced slightly from the flat side of the scabbard. Within the ferrule is riveted a spring member having a ring portion 30 and opposed clamping portions 31 which extend inwardly into the scabbard, converging toward each other and having concave curvature. These spring clamps are designed to engage yieldingly the bayonet within the scabbard and prevent any possibility of accidental displacement. Any other appropriate form of fitting may, of course, be substituted for that herein illustrated within the scope of our invention.

The novel process of our invention is not claimed herein but forms the subject matter of our divisional application Ser. No. 480,496, filed March 25, 1943.

Having thus disclosed our invention and described a specific embodiment thereof, together with a preferred process of manufacturing the same, we claim as new and desire to secure by Letters Patent:

A molded scabbard for a rifle bayonet, comprising a body of hard thermoplastic resin enclosing an elongated longitudinally tapering opening which is substantially circular in cross section, the scabbard presenting an external periphery which is substantially D-shaped in cross section, with its curved portions substantially concentric with the interior walls of the said opening, thus enclosing stiff relatively heavy longitudinal corner elements, and fabric reinforcing sheets held under compression within the resinous body of the scabbard and following the external periphery of the scabbard.

EDWIN L. BECKWITH.
CHARLES P. MacIVER.